March 9, 1937.  W. LEATHERS  2,072,892
SELF ALIGNING VACUUM CLEANER NOZZLE
Original Filed April 27, 1932   5 Sheets-Sheet 1
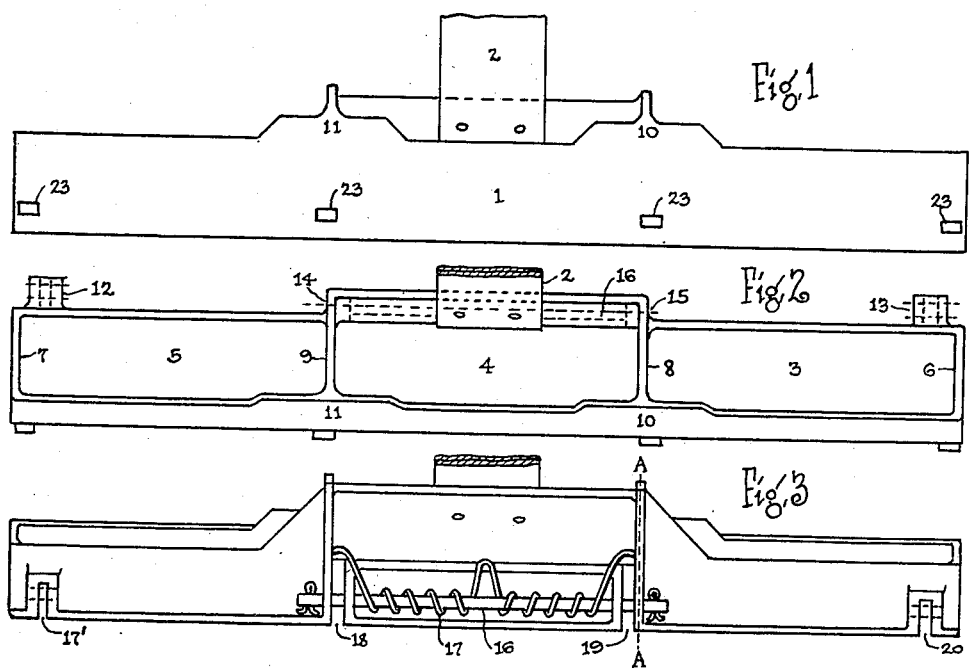
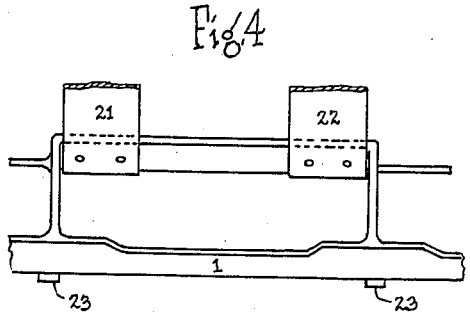
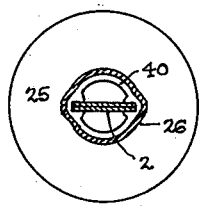
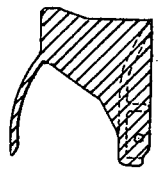
INVENTOR.

March 9, 1937. W. LEATHERS 2,072,892
SELF ALIGNING VACUUM CLEANER NOZZLE
Original Filed April 27, 1932 5 Sheets-Sheet 2
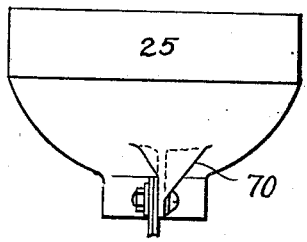
Fig. 17.
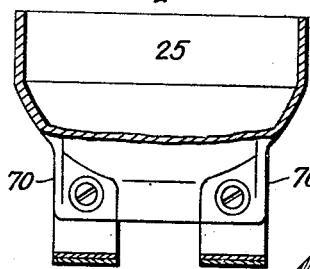
Fig. 18.
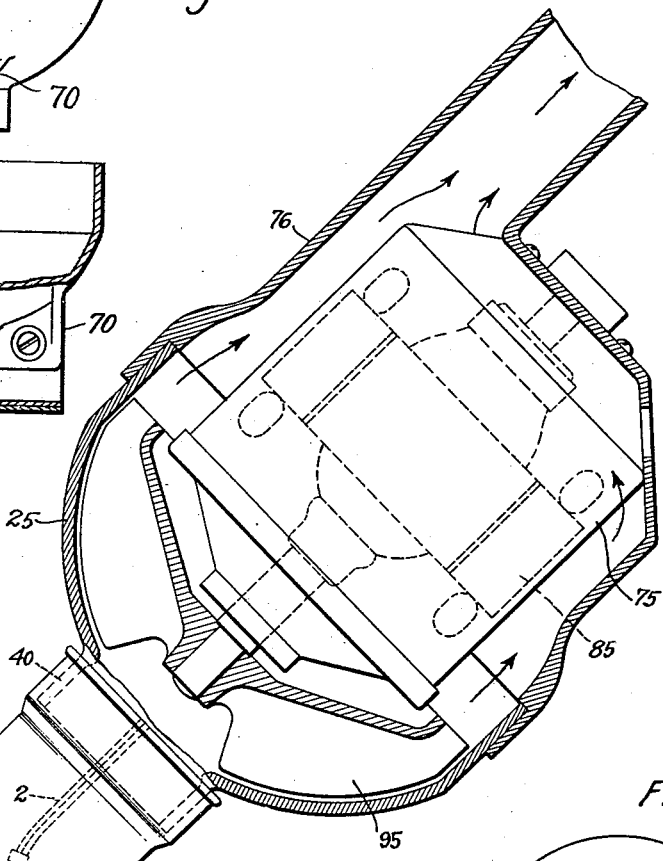
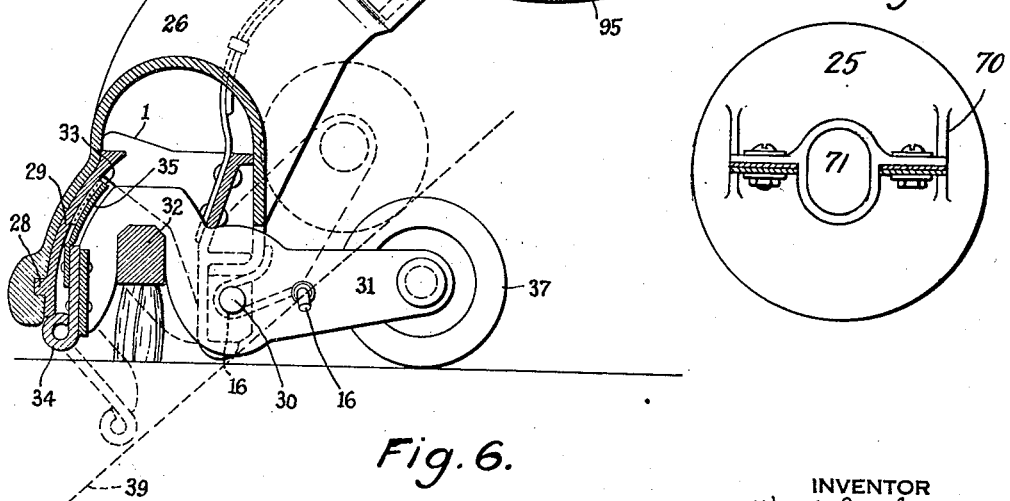
Fig. 6.
Fig. 19.
INVENTOR
Ward Leathers
BY
Prindle, Bean & Mann
ATTORNEY

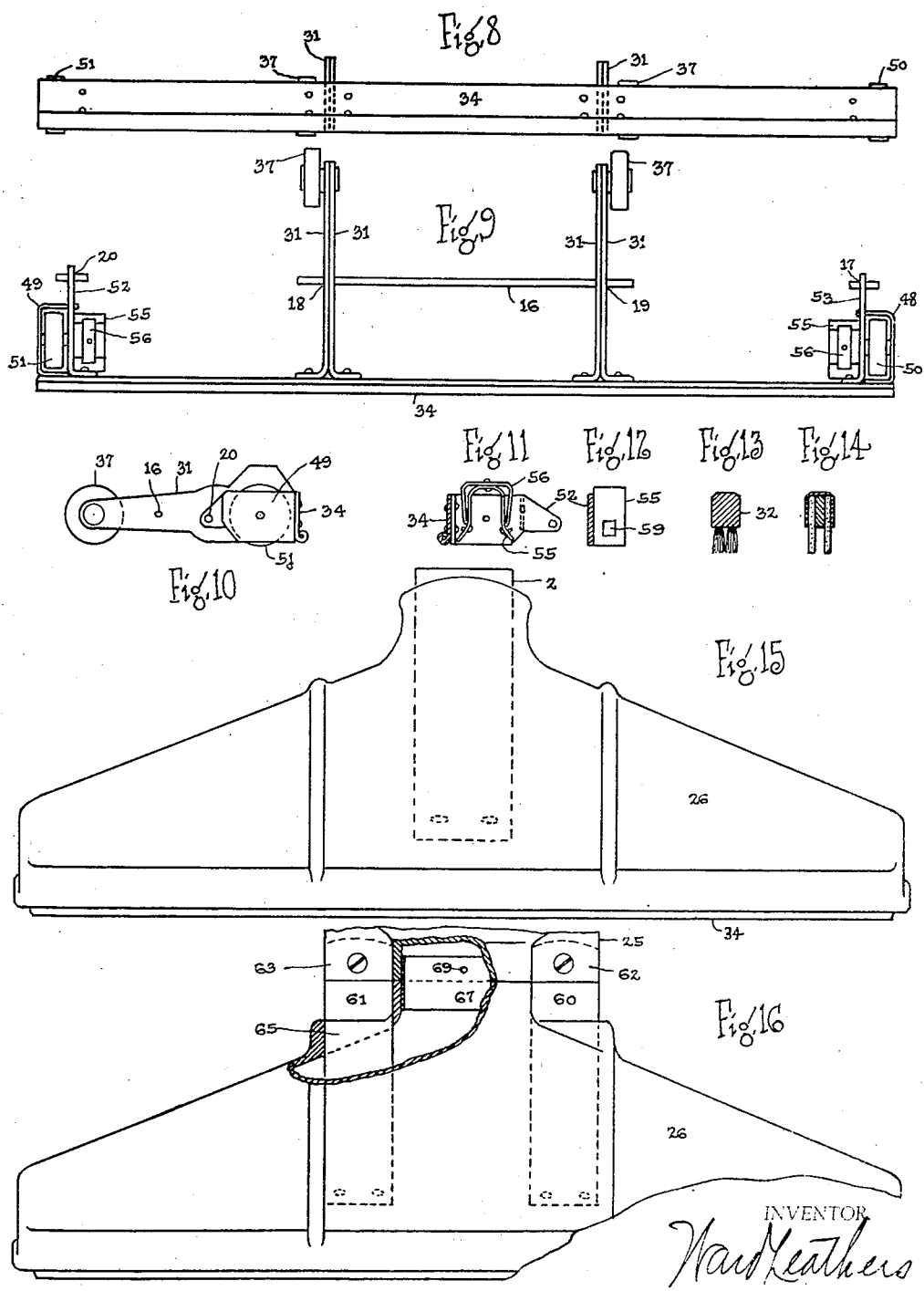

March 9, 1937.  W. LEATHERS  2,072,892
SELF ALIGNING VACUUM CLEANER NOZZLE
Original Filed April 27, 1932  5 Sheets-Sheet 4
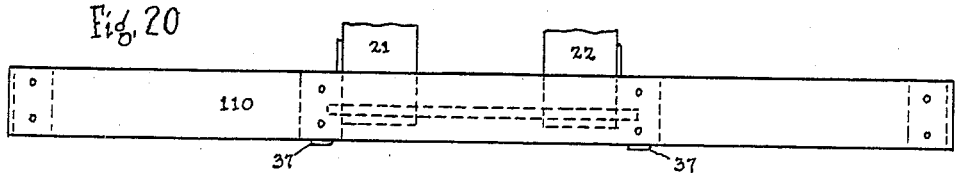
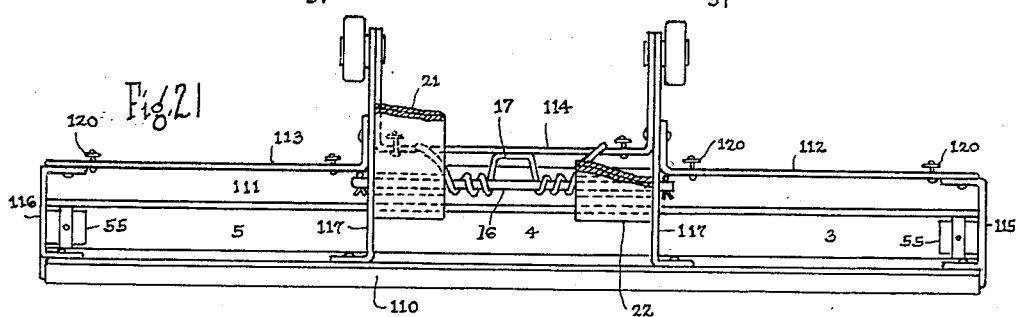
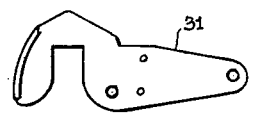
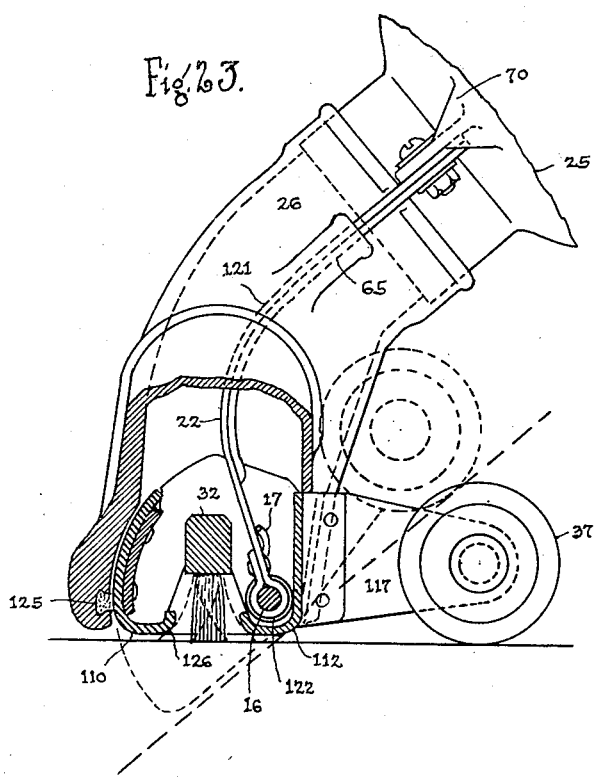
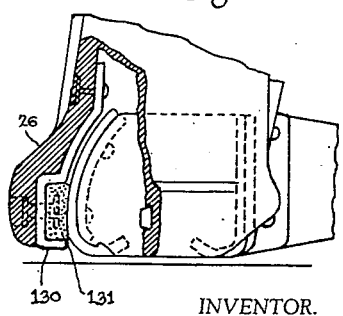
INVENTOR.
Ward Leathers March 9, 1937.  W. LEATHERS  2,072,892
SELF ALIGNING VACUUM CLEANER NOZZLE
Original Filed April 27, 1932   5 Sheets-Sheet 5
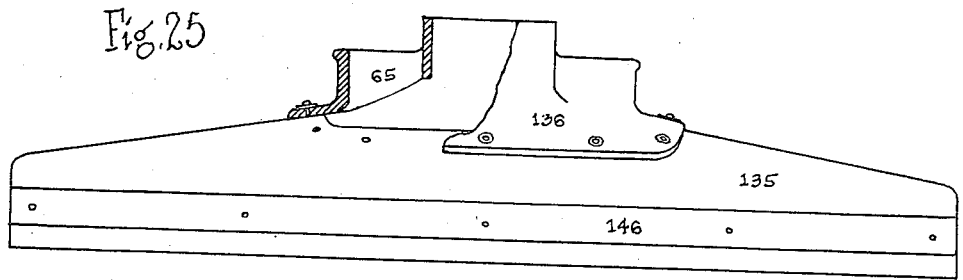
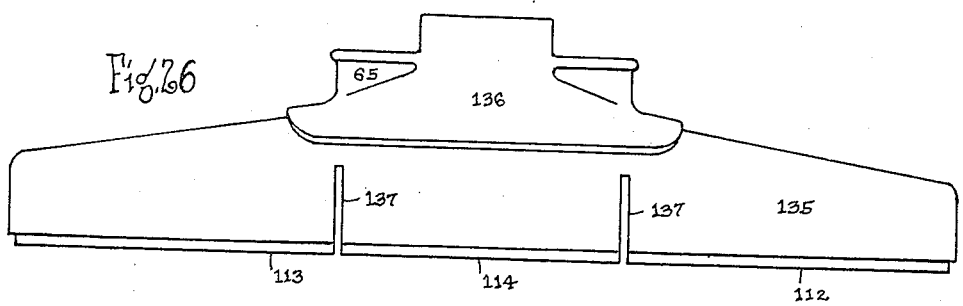
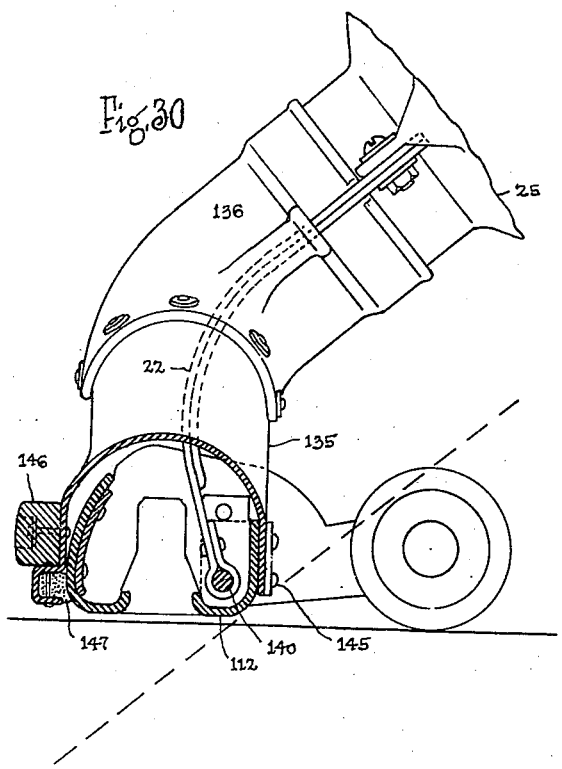
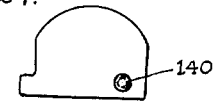
INVENTOR.
Ward Leathers Patented Mar. 9, 1937

2,072,892

UNITED STATES PATENT OFFICE 2,072,892

SELF ALIGNING VACUUM CLEANER NOZZLE

Ward Leathers, Haworth, N. J., assignor to Quadrex Corporation, a corporation of Delaware Application April 27, 1932, Serial No. 607,781
Renewed August 23, 1935

8 Claims. (Cl. 15—16)

The object of my invention is to produce a suction floor cleaner for serving a multiplicity of cleaning purposes in the highest conceivable manner and with the least weight and trouble.

This invention has largely to do with providing an improved nozzle which will be highly flexible, serving three functions, namely, sweep as a broom, mop as a dry mop on polished floors, and vacuum clean as a vacuum cleaner on rugs and carpets. To make such a tool light and of the highest practicability, the nozzle must also be automatically aligned with the floor, and preferably automatically opened on the forward side of broom or mop and closed on the rearward side and vice versa as the machine moves backward and forward on the floor. Heretofore, much work has been done on each of these several highly important functions. My present invention embodies these principles in a highly practical structure and provides a simple combination of all these necessary functions in one machine.

A further object of my invention is to combine this nozzle with suitable mechanism for the production of a light-weight, practical machine for the purposes set forth.

In order to set forth my invention so all those familiar with this art may fully understand it, I have prepared the following specifications to which I have appended drawings of which:—

Figure 1 is a front elevation of a cast nozzle stiffener.

Figure 2 is a top view of same.

Figure 3 shows the back elevation of same.

Figure 4 shows a multiple spring attachment.

Figure 5 shows a cross-section of same.

Figure 6 shows a partially cross-sectioned nozzle and motor suction unit assembly.

Figure 7 shows an end view of the motor suction casing.

Figure 8 shows a front view of the rocker assembly.

Figure 9 shows a plan view of the same.

Figure 10 shows an end view of the same.

Figure 11 shows a spring clip broom holder.

Figure 12 is a detail of the same.

Figure 13 is a cross-section of the brush.

Figure 14 is a cross-section of the dust mop.

Figure 15 is a front view of the nozzle.

Figure 16 is a partially sectioned front view of nozzles, showing multiple spring support.

Figures 17, 18, 19 show three views of the multiple spring attachment.

Figure 20 shows a front view of stamped nozzle stiffener with multiple spring attachment.

Figure 21 is a plan view of same.

Figure 22 is a side view of wheel arm-and-bridge.

Figure 23 shows a partially sectioned side view of complete nozzle assembly showing rocker assembly used as nozzle stiffener.

Figure 24 is a slight modification of same.

Figure 25 is a partially sectioned, front view of nozzle with the flexible element modified.

Figure 26 is a back view of same.

Figure 27 is an end view of same.

Figure 28 is an end view of the rocker for same.

Figure 29 is a detail of the rocker.

Figure 30 is a partially sectioned view of end of complete nozzle assembly with modification of the flexible element.

In Figures 1 to 15 inclusive, I have shown an operable structure which meets the requirements of the aforementioned objects of my invention. This group of figures illustrates a type of nozzle of which the casing is flexible rubber, the internal cross-stiffener is a casting, preferably a die-casting, rigidly held within the rubber nozzle and spring attachment made between said die-casting and the motor suction housing. Said spring lies within the dirt-laden air passage to the motor suction unit and a complete rocker mechanism is provided for operating within said die-casting and held thereby.

Figure 1 shows a front view of the internal stiffener. It consists of a die-casting 1 to which is joined a flat spring 2, as by rivets, the spring being of single or multiple leaf as desired.

Figure 2 shows that it consists essentially of a cage with openings 3, 4, and 5. It is provided with ends 6 and 7, and cross-members 8 and 9, the cross-members being reenforced at their forward attachment by increase in the side wall shown at 10 and 11. Backwardly projecting brackets 12 and 13 furnish hinging supports for the rocker mechanism to be described. Backwardly projecting portions of the cross-members 8 and 9 provide further bearing locations 14 and 15, for the rocker mechanism which is hinged thereto by means of a pin shown in dotted lines 16.

In Figure 3, the back of the casting 1 shows most clearly how hinging locations are provided at 17', 18, 19, and 20, for the rocker mechanism. The pin 16 is provided with a spring 17, the loop of which pushes forward on the die-casting and the ends of which are joined to the rocker mechanism in order to deflect it in the desired direction, namely, wheels toward the floor.

Figure 4 shows means of attaching a pair of springs or multiple springs 21 and 22 to the diecasting 1. Small projections 23 on the front side of the casting 21 are used for holding the diecasting snugly in the rubber nozzle.

Figure 5 is a cross-section of the die-casting 1 taken on the dotted line AA in Figure 3.

In Figure 6, the outer casing of the motor suction unit comprises a lower portion 25 joined to an upper portion 76. 75 designates an inner casing which houses the electric motor 85, this inner casing 75 being located within the aforesaid outer casing so as to be separated therefrom by an annular space through which the dirt laden air delivered by the fan 95 on the motor shaft passes from the nozzle up into a dirt filter (not shown) connected with the upper end of the motor suction unit. The lower portion 25 of the motor suction unit casing is joined to a flexible nozzle 26, preferably made of soft rubber. The die-casting 1 is permanently held in the rubber nozzle and the spring 2 flexibly attaches the casting 1 to the suction casing 25 (shown in Figure 7). An elongated slot 28 in the nozzle 26 engages the projections 23 for holding 1 and 26 in fixed relationship. The inner face 29 of the casting 1 is arcuate in form with its radial center at 30, which is the hinged center for the rocker mechanism of which several parts are shown and which is fully described under Figures 8 to 14 inclusive. The wheel arm-and-bridge 31 is so shaped that it goes around the back of the broom 32. A flange 33 turned thereon is joined as by rivets to a longitudinal member 34 which in turn supports a spring mounted felt wiper 35 which engages the arcuate surface 29. The arm-and-bridge 31 hinged about the pin 16 goes round when the floor cleaner is in use, by means of the wheel 37 hinged thereto in such manner that the nozzle opening is kept in alignment with the floor regardless of the angle of the rubber nozzle 26 with the floor. The nozzles described in my invention are for use primarily on that type of floor cleaner which carries the motor suction unit rigid with the handle. And, it is therefore possible to lay the machine flat on the floor and have this nozzle opening remain with perfect alignment with the floor for cleaning purposes. When the machine is so placed with respect to the floor that the dotted line 39 represents the floor line, the wheel 37 and the part 34 assume the position shown in the dotted lines. Under such conditions, the wiper 35 avoids leakage of air throughout the entire front edge of the nozzle between the rocker mechanism and the casting 1 and the broom 32 is in proper relationship with the floor for cleaning purposes. The suction casing 25 has a tubular projection, shown in dotted lines at 40, inside of which the spring 2 finds anchorage in a slot.

Figure 7 shows an end view of the suction casing wherein the tubular projection 40 is slightly deformed in order to provide a slot for the spring 2, the hole being surrounded in air-tight manner by the rubber casing 26.

Figures 8 and 12 inclusive, show the rocker mechanism used in the assembly of Figure 6. The figures clearly illustrate the relationship of the parts and the bearing locations 17', 18, 19, and 20. Small stamped end brackets 48 and 49 support small wheels 50 and 51 made of flexible material such as soft rubber. Brackets 52 and 53 rigidly attached to 34 serve as stiffeners and furnish hinge end supports. Sheet metal clips 55 attached to 52 and 53 have attached to them, at the top, springs 56. These springs are so formed and disposed that their free and yielding ends pass through openings 59 in the sides of the clip 55 and serve as grips for the broom or dust mop.

Figure 13 shows a cross-section of a broom which extends lengthwise of the nozzle and is instantaneously and manually removable since it is held merely by the spring 56.

Figure 14 shows a felt, or felts, held in a back of similar size and shape and to be used in similar manner to the broom 32 for use on polished floors. But the broom and the felt-mop may be sufficiently flexible as to close the openings to the nozzle when in use as more clearly illustrated in Figures 23 and 30.

Figure 15 shows a front view of the nozzle 26 set forth in Figures 1, 2, 3, 6, 8, 9.

Figure 16 shows the same nozzle 26 from which projects a pair of springs 60 and 61 joined to the suction casing 25 by means of brackets and bolts 62 and 63. The curve of the nozzle throat is disregarded in this drawing. It will be noted that the springs 60 and 61, single leaf or multiple leaf, pass through slots in the rubber housing 26 at 65. These slots are so formed that they grip the spring in substantially air-tight manner. A metal ferrule 67 joins 26 to 25 and it is preferable to anchor same to 25 as with a rivet 69. These two springs 60 and 61 serve like the spring 2 to support the suction casing 25 and the rest of the cleaner flexibly from the stiffener casting 1 enclosed by the rubber nozzle 26.

Figures 17, 18, and 19 show three views of the dual spring attachment to the motor suction housing 25. The brackets 70 are preferably cast integral with 65 and the air inlet 71 is shown slightly elongated.

In Figures 20 to 23 inclusive, I have described a form and structure for my invention similar in function to that of Figures 1 to 6 inclusive but with the die-casting 1 eliminated. The stiffening element here, so essential in mounting a nozzle for cleaning-purposes, has been obtained by dual use of the rocker mechanism itself, the object of this structure being to provide the exceptional advantages of a flexible floor aligning nozzle in a cheaper structure.

Figures 20 and 21 show a front and top view respectively of a rocker mechanism wherein a lead edge 110 of arcuate section (see Figure 23), is joined to a rearward portion 111. It will be noted that the rearward portion is built up of several stampings 112, 113, and 114. End pieces 115 and 116 join 110 and 111. The wheel arm-and-bridge 7 has the shape illustrated in Figure 22. Rivets and washers 120 join the rear edge of the flexible rubber housing to the rocker assembly. Since the rubber housing 26 is attached only by its back wall to the rocker assembly, said rubber back wall of the housing bends or flexes sufficiently to permit pivoting or hinging of the rocker assembly to the limited extent required in the use of the cleaner.

In Figure 23, it will be noted that in order to join the rocker assembly to the blower housing 25 by a spring support it becomes highly desirable to have the springs 21 and 22 (Figs. 22 and 23) hinged thereto as shown at 122. The pin 16 (see Figure 21) passes through the wheel arm-and-bridge 117, forming a suitable hinge between the rocker assembly and the springs 21 and 22. The rubber nozzle 26 is provided with a felt wiper 125 gripped therein by friction. The part 110 has an arcuate outer face with its radial center concentric with the pin 16 with its inner edge 126 so disposed that when the broom 32, or the felt mop, are in use, they automatically close the opening between them and the part 126 when the machine is drawn backward on the floor. In similar manner they close the opening between them and the opposite similar part when pushed forward on the floor. This altered position, due to their flexure, is shown in dotted lines.

Figure 24 shows the end view, with a portion of the rubber removed, of the same nozzle as in Figure 23 but with a modification consisting of a rigidifying member 130 disposed lengthwise of the nozzle and suitably attached to the rubber 26. Within the part 130, the felt wiper 131 may be firmly anchored.

The operation of the nozzle mechanism shown in Figs. 20 to 24 inclusive is essentially the same as that of the mechanism shown in Figs. 1 to 16 inclusive. The modification shown in Figs. 20 to 24 comprises the use of two leaf springs 21 and 22 instead of a central leaf spring 1. The lower ends of the springs 21 and 22, instead of being riveted to the cross member, are hinged thereto as shown at 122. Whereas the spring 17 in Figs. 1 to 6 provides a turning force between the parts 1 and 31, the same spring 17 in Figs. 20 to 24 exerts a turning force between 110 and the main support springs 22.

Figures 25 to 30 inclusive show a modification of the structures of Figures 20 to 24 inclusive, the modification consisting primarily of using only a small portion of flexible material such as rubber near the outlet of the nozzle, the remainder being of metal, preferably stamped sheet metal as illustrated.

Figure 25 shows a front view with the main nozzle casing 135 of sheet metal and with an outlet rubber portion 136. The two may be joined together in any desired manner as by rubber contraction or by rivets as shown.

Figure 26 shows a back view of the same nozzle showing slots 137 through which the wheel arm-and-bridges may project.

Figure 27 shows an end view of the metal casing 135 wherein the end of a pin 140 is exposed. This pin passes the entire length of the nozzle forming the hinged supports for the rocker mechanism as 16 serves that purpose in Figures 21 and 23.

Figure 28 is an end view of the rocker mechanism as it appears immediately inside of the end shown in Figure 27. The dotted lines in Fig. 28 show those portions of the sheet-metal sides turned under to decrease the width of the nozzle opening and provide sliding surfaces for contacting the floor.

Figure 29 is a stamped bracket which may be joined to the housing 135 at 145 (in Figure 30) and is one of a plurality of such brackets to support the pin 140.

In Figure 30, a rubber bumper 146 is suitably attached to the housing 135 and a felt wiper 147 is held within a channel self-formed in the stamping 135.

I claim:—

1. In a suction cleaner, a motor-driven suction-unit rigidly joined to the handle of said cleaner, a flexible nozzle housing, a rigid cross-member within said nozzle housing, a leaf spring firmly held at one end by the housing of said suction-unit and joined at the other end to said cross-member, and a rocker member disposed within said nozzle housing hinged to the rigid cross-member on a horizontal axis towards the back of said nozzle housing, said rocker member at its margin being in slidable, substantially air-tight cooperation with the adjacent interior walls of the nozzle housing, the body of said rocker member having an opening therethrough serving as the suction mouth of the cleaner, said rocker member further having a rearwardly projecting arm supporting a floor wheel at its rearward end for keeping the suction mouth of the rocker member adjacent the floor.

2. The invention defined in claim 1, further characterized by spring means acting between the rigid cross member and the rocker member tending to push the rearwardly projecting arm of said member away from the cross-member and downwardly towards the floor.

3. In a suction cleaner, in combination, a motor-driven suction-unit; a casing therefor; a flexible tubular connector having its upper end attached to the suction-unit casing a stiffener frame attached to the lower end of the flexible tubular connector; and a leaf spring connection between the suction-unit casing and said stiffener frame supporting the former from the latter.

4. In a suction cleaner, in combination, a motor-driven suction-unit; a casing therefor; a flexible tubular connector having its upper end attached to the suction-unit casing; a stiffener frame attached to the lower end of said flexible tubular connector; a leaf spring connection between the suction-unit casing and said stiffener frame supporting the former from the latter; a rocker frame within the stiffener frame hinged on a horizontal axis at the back of the stiffener frame and having a suction-slot up through the same; and means for maintaining substantially air-tight cooperation between the walls of the frames during hinging motion between them.

5. In a suction cleaner, in combination, a motor-driven suction-unit; a casing therefor; a flexible tubular connector having its upper end attached to the suction-unit casing; a stiffener frame attached to the lower end of said flexible tubular connector; a leaf spring connection between the suction-unit casing and said stiffener frame supporting the former from the latter; a rocker frame within the stiffener frame hinged on a horizontal axis at the back of the stiffener frame; means for maintaining substantially air-tight cooperation between the walls of the frames during hinging motion between them, said rocker frame being in floor contact when the cleaner is in use and having a suction slot up through same; and having a rearwardly extending arm supporting a floor wheel.

6. In a suction cleaner, in combination, a motor-driven suction-unit; a casing therefor; a flexible tubular connector having its upper end attached to the suction-unit casing; a stiffener frame attached to the lower end of said flexible tubular connector; a leaf spring connection between the suction-unit casing and said stiffener frame supporting the former from the latter; a rocker frame within the stiffener frame hinged on a horizontal axis at the back of the stiffener frame; means for maintaining substantially air-tight cooperation between the walls of the frames during hinging motion between them, said rocker frame being in floor contact when the cleaner is in use and having a suction slot up through same and being provided with means for detachably supporting a brush at said slot and having a rearwardly extending arm supporting a floor wheel.

7. In a suction cleaner, in combination, a motor-driven suction-unit; a casing therefor; a flexible tubular connector having its upper end attached to the suction-unit casing; a stiffener frame attached to the lower end of said flexible tubular connector; a leaf spring connection between the suction-unit casing and said stiffener frame supporting the former from the latter; a rocker frame within the stiffener frame hinged on a horizontal axis at the back of the stiffener frame; means for maintaining substantially air-tight cooperation between the walls of the frames during hinging motion between them, said rocker frame being in floor contact when the cleaner is in use and having a suction slot up through same and having a rearwardly extending arm supporting a floor wheel; and spring means acting between the stiffener and the rocker frames tending to hold the wheel on the rearwardly extending arm of the rocker frame yieldingly against the floor.

8. In a suction cleaner, in combination, a motor-driven suction unit, a casing therefor; a tubular connector having its upper end attached to the suction unit casing; a rocker member hingeably supported within the lower end of the tubular connector on a horizontal transverse axis located towards the back wall of said connector, said rocker member at its margin having substantially air-tight sliding cooperation with the inside of the tubular connector, said rocker member having a suction slot up through the same located in front of said hinging axis, and further having a rearwardly projecting arm supporting a floor wheel rearwardly of the aforesaid hinging axis of the rocker member.

WARD LEATHERS.